(12) United States Patent
Revill

(10) Patent No.: US 9,194,064 B2
(45) Date of Patent: Nov. 24, 2015

(54) TUBULAR ELASTICATED NET WITH INEXTENSIBLE WEFT

(75) Inventor: Stuart Revill, Swadlincote (GB)

(73) Assignee: Trunature Limited, Measham, Swadincote (GB)

( * ) Notice: Subject to any disclaimer, the term of this patent is extended or adjusted under 35 U.S.C. 154(b) by 0 days.

(21) Appl. No.: 13/516,308

(22) PCT Filed: Dec. 31, 2010

(86) PCT No.: PCT/GB2010/002347
§ 371 (c)(1),
(2), (4) Date: Jun. 15, 2012

(87) PCT Pub. No.: WO2011/080509
PCT Pub. Date: Jul. 7, 2011

(65) Prior Publication Data
US 2012/0308750 A1    Dec. 6, 2012

(30) Foreign Application Priority Data

Dec. 31, 2009 (GB) .................................. 0922728.1
Jan. 12, 2010 (GB) .................................. 1000419.0

(51) Int. Cl.
   B32B 1/08       (2006.01)
   D04B 21/12      (2006.01)
   A22C 11/00      (2006.01)
   A22C 13/00      (2006.01)

(52) U.S. Cl.
   CPC ............ *D04B 21/12* (2013.01); *A22C 11/005* (2013.01); *A22C 13/00* (2013.01); *A22C 2013/0056* (2013.01); *D10B 2505/10* (2013.01); *Y10T 428/1324* (2015.01); *Y10T 428/1362* (2015.01)

(58) Field of Classification Search
   CPC ............... A22C 13/00; A22C 13/0013; A22C 13/0056; A22C 13/0093; B23B 1/02; B23B 1/08; B23B 5/02; B23B 5/028; B23B 5/08; B23B 5/12; B23B 7/14; B23B 15/06; B23B 15/08; B23B 2038/0028; B23B 2307/51; B23B 2307/734; B23B 2319/00; B23B 2439/70; B65D 29/04; Y10T 428/1324; Y10T 428/1362
   USPC ........... 428/34.8, 34.9, 35.7, 36.1, 36.3, 36.8; 442/5, 20, 37, 49, 50, 54
   See application file for complete search history.

(56) References Cited

U.S. PATENT DOCUMENTS 1,679,822 A    2/1927    Hall

FOREIGN PATENT DOCUMENTS

| EP | 1154696 A1 | 11/2001 |
| GB | 2333301 A  | 7/1999  |
| GB | 2380179 A  | 4/2003  |

OTHER PUBLICATIONS

International Search Report Apr. 26, 2011.

*Primary Examiner* — Walter B Aughenbaugh
(74) *Attorney, Agent, or Firm* — Clifford H. Kraft

(57) ABSTRACT

A tubular elasticated net used for cooking layered or rolled meat products such as cooked ham has independent elastic (12) and inextensible (13) weft threads. The inextensible threads (13) limit the diametral expansion of the tube to the desired shape of the finished product, while the elastic thread (12) squeezes the meat during cooking.

9 Claims, 1 Drawing Sheet

TUBULAR ELASTICATED NET WITH INEXTENSIBLE WEFT

This application is a national phase entry into the United States from application PCT/GB2010/002347 with international filing date Dec. 31, 2010 which claims priority to British application number 1000419.0 filed Jan. 12, 2010 which claimed priority to British application number 0922728.1 filed Dec. 31, 2009.

BACKGROUND

1. Field of the Invention

The present invention relates preparing tubular meat products and more particularly to a tubular elasticated net with an inextensible weft.

2. Description of the Prior Art

Tubular elasticated netting is used to encapsulate meat products such as joints of beef or pork. The net remains on the joint during cooking to retain the shape and integrity of the joint. An example of a knitting machine which produces such netting is to be found in our British Patent No. 2333301. An example of a machine which packages meat in such netting is to be found in our British Patent No. 2380179. Reference is made to the specifications of these Patents for a clearer understanding of the present invention.

In addition to its use on joints of meat elasticated netting is also used in the preparation and presentation of cooked meat products such as sausages, hams, salamis and frankfurters. Portions of these products are encased in plastics, or sometimes fibrous, enclosures which limit their expansion during cooking and result in the uniform, cylindrical cooked meat products which supermarkets require for presentation and sales purposes, and which facilitate slicing. Emulsions are commonly contained in collagen film. However it is necessary for the meat to be squeezed during cooking to prevent distortions due to the formation of voids as fats are melted. To achieve this, the imperforate casing has been enclosed in a tubular, elasticated net. However, unless the stretch of the elastic is limited, the result is unlikely to be the desired, uniform cylinder.

U.S. Pat. No. 1,679,822 discloses a rubber thread covered with helically wound textile threads. The latter are said to limit the stretch of the rubber as they straighten, i.e. as the pitch of the spiral windings increases. European Patent No. 1154696 discloses the use of such a covered thread as the weft of a net used to encapsulate food products. The yarn windings on the rubber thread limit the stretch of the rubber.

Nets of the kind described in European Patent No. 1154696 have been in extensive commercial use throughout the world for at least the past twenty years. Problems arising from the use of such nets to control the shape of cooked meat products include the following: As acknowledged in U.S. Pat. No. 1,679,822, if inextensible and rubber threads are simply laid side-by-side and covered by yarn windings, the resulting thread is so deformed as to be unmanageable and unsightly except when under extreme tension. If a fine cotton or nylon thread is wound helically around the rubber thread, it is easily broken when tensioned. The use of a thicker, stronger inextensible thread is not only expensive but greatly diminishes the stretchability of the rubber. In any event the limit of stretch of such an assembly is not precisely determinable. The extent to which the yarn will bite into the rubber as the latter is stretched will vary as will the ultimate pitch angle of the helically wound yarn.

SUMMARY OF THE INVENTION

A principal object of the present invention is to improve upon prior art proposals such as the above.

In accordance with one aspect of the present invention, there is provided a method of preparing a meat product for cooking characterized in that it comprises forcing the product into a tubular net which has mutually independent (as herein defined) elastic and substantially inextensible weft threads until straightening of the inextensible weft threads limits the diametral expansion of the net. Tensioning of the elastic weft threads subjects the product to a compressive force.

In accordance with another aspect of the present invention there is provided a tubular net for use in carrying out the method of the immediately preceding paragraph, the net comprising spaced apart warp threads and spaced apart pairings of elastic and substantially inextensible weft threads, characterized in that the elastic and inextensible weft threads are in an independent relationship (as herein defined); all of the weft threads being connected to each of the warp threads, the arrangement being such that when the elastic weft threads are in a relaxed condition, the inextensible weft threads are in a slack, unstraightened condition, and such that straightening and tensioning of the inextensible weft threads as the elastic weft threads are stretched positively limits the diametral expansion of the net.

Figure 1:
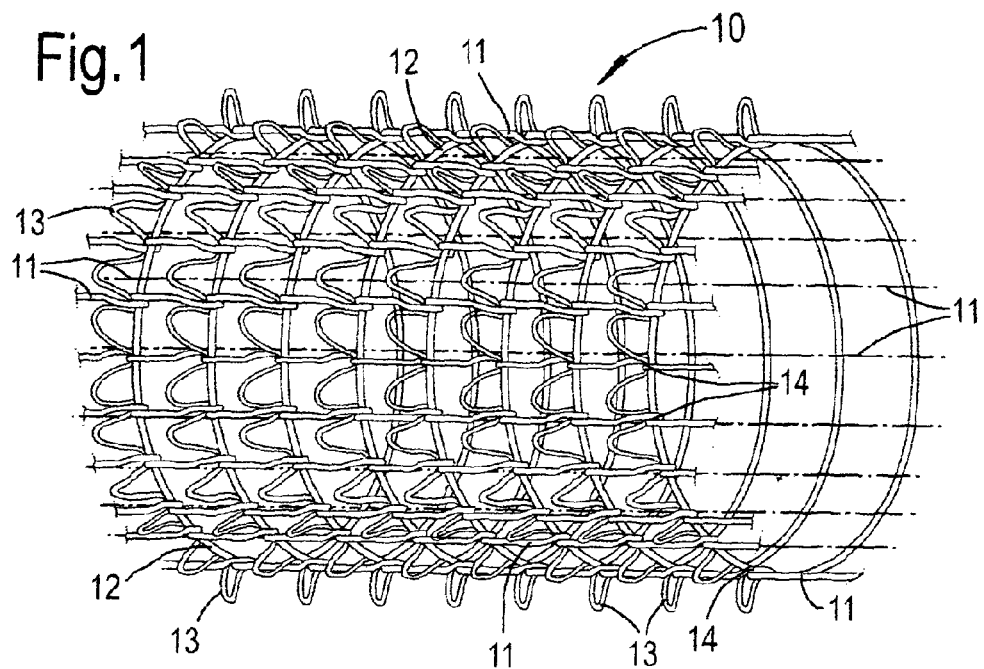
FIG. 1 illustrates a tubular net in accordance with the present invention in a relaxed condition.

Several drawings and illustrations have been presented to aid in understanding the present invention. The scope of the present invention is not limited to what is shown in the figures.

DETAILED DESCRIPTION

A system and method of preparing a meat product for cooking by forcing the product into a tubular net which has mutually independent elastic and substantially inextensible weft threads until straightening of the inextensible weft threads limits the diametral expansion of the net. Tensioning of the elastic weft threads subjects the product to a compressive force.

A tubular net having spaced apart warp threads that can be string and spaced apart pairings of elastic and substantially inextensible weft threads is provided, characterized in that the elastic and inextensible weft threads are in an independent relationship. All of the weft threads are connected to each of the warp threads, the arrangement being such that when the elastic weft threads are in a relaxed condition, the inextensible weft threads are in a slack, unstraightened condition, and that straightening and tensioning of the inextensible weft threads as the elastic weft threads are stretched positively limits the diametral expansion of the net.

By an independent relationship of the two threads is meant that they are not twisted or otherwise connected together throughout their lengths. However they are both advantageously connected to the separated warp threads of the net conveniently at the same points along the lengths of the warp threads. In the relaxed condition of the elastic thread, the non-elastic thread lies loose between the warp threads.

The use of an inextensible thread independent of the elastic thread enables the use of an inextensible thread of whatever strength is desired without either impeding the stretchability of the elastic thread or unacceptably raising the cost of production of the net. The elastic weft thread might be of bare rubber, but more typically, it has a rubber or synthetic rubber core upon which cotton, polyester or nylon yarn is helically wound to cover the core. The elastic weft thread and the inextensible or inelastic weft thread, which may simply be string, are drawn from separate bobbins and knitted to, or laid into the stitches of, the warp threads as the tubular net is produced in the conventional way.

Having a definite limit to the diametral expansion of the net enables the accurate production of tubular nets suited to stuffing machines with nozzles of different sizes. Meat products are typically rolled or layered and forced through the nozzle to fill the net.

As stated, the elastic weft thread component may be of bare rubber or may have a rubber or synthetic rubber core covered by helically wound textile or plastics yarn. The inextensible weft thread component may be of string. The warp thread may be of string.

In accordance with yet another aspect of the present invention, there is provided a method of manufacturing the net described which comprises drawing the elastic and the inextensible weft threads from separate bobbins and knitting them both to the warp threads, or laying them both into the stitches of the warp threads of the net such that between the warp threads the elastic and substantially inextensible weft threads are unconnected. The elastic and inextensible weft threads may be joined to the warp threads at the same points along the lengths of the latter.

In accordance with yet another aspect of the present invention there is provided a method of preparing a cooked meat product which comprises layering or rolling the meat and forcing it through a nozzle into a net as described. Chosen lengths of the extruded, netted product may then be cooked.

Figure 2:
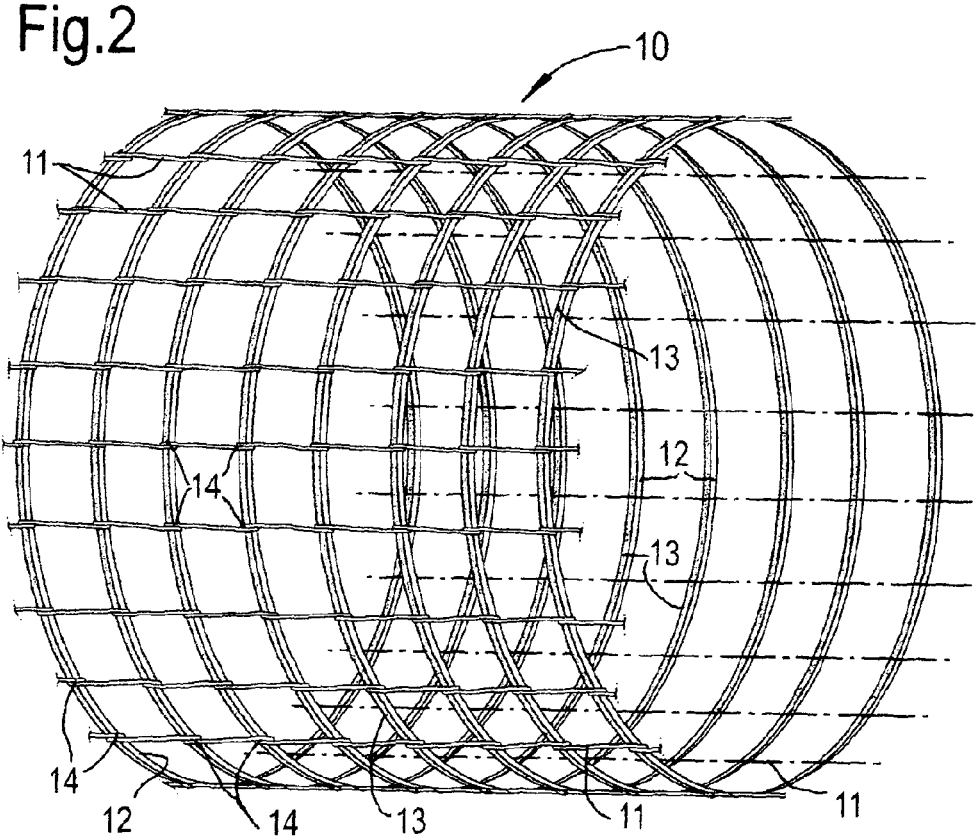
FIG. 2 illustrates the net of FIG. 1 when expanded to its maximum diameter.

A preferred embodiment of the invention will now be described by way of non-limiting example with reference to the accompanying drawings, in which:

FIG. 1 illustrates a tubular net in accordance with the present invention in a relaxed condition, and FIG. 2 illustrates the net of FIG. 1 when expanded to its maximum diameter.

The tubular net 10 illustrated comprises separated warp threads 11 and separated elastic weft threads 12, the weft threads 12 either being of bare rubber or having a rubber core covered with helical windings of a textile or plastics material. As so far described, the net is conventional. In accordance with the invention however, additional, inextensible weft threads 13 of string are provided. In the production of the net, the elastic 12 and inextensible weft threads 13 are drawn from separate bobbins and both knitted to the warp threads 11 at the same points 14 along the lengths of the latter. Alternatively the weft threads 12 and 13 can be laid into the stitches of the warp threads 11 at the points 14. Because of the provision of the inextensible threads 13, the elastic threads 12 can be of bare rubber.

In the relaxed condition of the elastic weft threads 12, the net 10 is of relatively small diameter as shown in FIG. 1, and the string weft threads 13 are unstraightened and form loops between the warp threads. When the net 10 is expanded by forcing a meat product into it through a nozzle, the elastic weft threads 12 are tensioned, and the string weft threads 13 straightened until, as shown in FIG. 2, the net 10 reaches a maximum diameter permitted by the string weft threads 13. The elastic weft threads 12 continue to exert a squeezing force on the meat while it is being cooked, but the inextensible weft threads 13 prevent distortion of the product and ensure a uniform, cylindrical shape.

In one example of the use of the net 10, ham cut from the bone was layered or rolled, and then forced into the tubular net through a nozzle, the net expanding to receive the meat and thus exerting a squeezing pressure on the meat. Predetermined lengths of the netted meat were then separated and cooked, the maximum expansion of the net determining the final shape of the cooked product.

As used herein, the description inextensible of the weft threads 13 is qualified by substantially to allow for the fact that even a thread material such as string has a limited ability to stretch. The essential feature is that the inelastic weft threads 13 are very much less stretchable that the elastic weft threads 12, so that the object of the invention can be achieved.

Several descriptions and illustrations have been presented to aid in understanding the present invention. One with skill in the art will realize that numerous changes and variations are possible without departing from the spirit of the invention. Each of these changes and variations is within the scope of the present invention.

The invention claimed is:

1. A tubular net for encapsulating a meat product, the net comprising spaced apart warp threads and spaced apart pairings of elastic and non-elastic weft threads connected to the warp threads characterised in that the elastic and the non-elastic weft threads are parallel with one another when the elastic weft threads are in a fully stretched condition and have no connection to one another between the warp threads, the arrangement being such that when the elastic weft threads are in a relaxed condition, the non-elastic weft threads are in a slack, unstraightened condition, and such that straightening and tensioning of the non-elastic weft threads as the elastic weft threads are stretched positively limits the diametral expansion of the net.

2. A net as claimed in claim 1, characterised in that the elastic and non-elastic weft threads of each pair are connected at the same points along their lengths to the warp threads, these being the only connections between the elastic and non-elastic weft threads.

3. A net as claimed in claim 1, characterised in that the weft threads are knitted to the warp threads.

4. A net as claimed in claim 1, characterised in that the weft threads are laid into the stitches of the warp threads.

5. A net as claimed in claim 1 characterised in that the elastic weft threads are of bare rubber.

6. A net as claimed in claim 1, characterised in that each of the elastic weft threads has a rubber or synthetic rubber core covered by helically wound textile or plastic yarn, and wherein the non-elastic weft threads are string.

7. The net as claimed in claim 1 wherein forcing a meat product into the tubular net until straightening of the non-elastic weft threads limits the diametral expansion of the net while tensioning of the elastic weft threads subjects the meat product to a compressive force.

8. The net of claim 1 manufactured by drawing the elastic and the non-elastic weft threads from separate bobbins and knitting them both to, or laying them both into the stitches of, the warp threads of the net such that between the warp threads the elastic and non-elastic weft threads are unconnected.

9. The net of claim 1 whereby the meat product is layered or rolled and forced through a nozzle into the net, and chosen lengths of the meat product are separated prior to cooking the same.

* * * * *